United States Patent
Hurwitz et al.

(10) Patent No.: US 8,935,073 B2
(45) Date of Patent: Jan. 13, 2015

(54) REDUCED TAKE-OFF FIELD LENGTH USING VARIABLE NOZZLE

(75) Inventors: Wayne Hurwitz, West Hartford, CT (US); Ashok K. Jain, Tempe, AZ (US)

(73) Assignee: United Technologies Corporation, Hartford, CT (US)

( * ) Notice: Subject to any disclaimer, the term of this patent is extended or adjusted under 35 U.S.C. 154(b) by 1606 days.

(21) Appl. No.: 12/374,131

(22) PCT Filed: Oct. 12, 2006

(86) PCT No.: PCT/US2006/040070
§ 371 (c)(1),
(2), (4) Date: Jan. 16, 2009

(87) PCT Pub. No.: WO2008/045082
PCT Pub. Date: Apr. 17, 2008

(65) Prior Publication Data
US 2009/0259379 A1 Oct. 15, 2009

(51) Int. Cl.
G06F 19/00 (2011.01)
G06G 7/70 (2006.01)

(52) U.S. Cl.
USPC .............. 701/100; 244/55; 244/56; 60/226.3; 60/770

(58) Field of Classification Search
USPC ................ 701/99–100; 415/144, 151, 149.2, 415/149.3, 152.1, 154.3, 154, 45, 116–118, 415/220, 914, 55.2; 60/226.2, 226.3, 204, 60/239, 39.282, 242, 771, 226.1, 226, 60/228; 239/265.33, 265.35, 265.11, 239/265.37
See application file for complete search history.

(56) References Cited

U.S. PATENT DOCUMENTS

| | | | |
|---|---|---|---|
| 3,000,177 A | | 9/1961 | Logerot et al. |
| 3,020,714 A | | 2/1962 | Eggers et al. |
| 3,806,068 A | | 4/1974 | Blythe et al. |
| 3,863,867 A | | 2/1975 | Souslin et al. |
| 3,932,058 A | * | 1/1976 | Harner et al. .................. 416/28 |
| 4,132,068 A | * | 1/1979 | Johnston ...................... 60/226.2 |
| 4,254,619 A | * | 3/1981 | Giffin et al. .................. 60/226.1 |
| 4,258,545 A | * | 3/1981 | Slater .......................... 60/226.1 |

(Continued)

FOREIGN PATENT DOCUMENTS

| | | |
|---|---|---|
| EP | 0848 152 | 6/1998 |
| GB | 2 023 075 | 12/1979 |
| WO | 2007/122368 | 11/2007 |

OTHER PUBLICATIONS

The SECAD project—vulnerability reduction via propulsion control logic; Pisano, A.; Frankenberger, C.E.; Aerospace Conference, 2006 IEEE; Digital Object Identifier: 10.1109/AERO.2006.1656079; Publication Year: 2006.*

(Continued)

Primary Examiner — Cuong H Nguyen
(74) Attorney, Agent, or Firm — Carlson, Gaskey & Olds, P.C.

(57) ABSTRACT

A turbofan engine control system and method includes a core nacelle housing (12), a compressor and a turbine. A turbofan is arranged upstream from the core nacelle and is surrounded by a fan nacelle (34). A bypass flow path (39) is arranged downstream from the turbofan between the core and fan nacelles. The bypass flow path includes a nozzle exit area (40). A controller (50) detects at least one of a take-off condition and a landing condition. The controller changes effectively the nozzle exit area to achieve a thrust vector in response to the take-off and landing conditions.

20 Claims, 4 Drawing Sheets

(56) References Cited

U.S. PATENT DOCUMENTS

| | | | |
|---|---|---|---|
| 4,294,069 A * | 10/1981 | Camp | 60/238 |
| 4,644,806 A * | 2/1987 | Flagg et al. | 73/863.58 |
| 4,827,712 A * | 5/1989 | Coplin | 60/226.1 |
| 5,048,285 A * | 9/1991 | Schmitt et al. | 60/204 |
| 5,706,649 A * | 1/1998 | Robinson et al. | 60/226.2 |
| 5,857,321 A * | 1/1999 | Rajamani et al. | 60/39.27 |
| 6,392,313 B1 * | 5/2002 | Epstein et al. | 290/52 |
| 6,582,183 B2 * | 6/2003 | Eveker et al. | 415/1 |
| 7,328,128 B2 * | 2/2008 | Bonanni et al. | 702/182 |
| 7,721,549 B2 * | 5/2010 | Baran | 60/770 |
| 7,725,293 B2 * | 5/2010 | Bonissone et al. | 702/183 |
| 7,802,760 B2 * | 9/2010 | Webster | 244/207 |
| 8,235,325 B2 * | 8/2012 | Schafer | 244/53 R |
| 2003/0070417 A1 | 4/2003 | Plumpe, Jr. | |
| 2004/0216446 A1 | 11/2004 | Bonnet et al. | |
| 2004/0237501 A1 | 12/2004 | Brice et al. | |
| 2008/0190095 A1 * | 8/2008 | Baran | 60/226.3 |
| 2008/0302907 A1 * | 12/2008 | Schafer | 244/54 |
| 2009/0226303 A1 * | 9/2009 | Grabowski et al. | 415/151 |
| 2009/0259379 A1 * | 10/2009 | Hurwitz et al. | 701/100 |
| 2010/0011740 A1 * | 1/2010 | McVey | 60/204 |
| 2010/0162683 A1 * | 7/2010 | Grabowski et al. | 60/226.3 |
| 2010/0223902 A1 * | 9/2010 | Mailander et al. | 60/39.83 |
| 2010/0229528 A1 * | 9/2010 | Ramlaoui et al. | 60/226.2 |
| 2010/0236216 A1 * | 9/2010 | Winter et al. | 60/204 |
| 2011/0004388 A1 * | 1/2011 | Winter | 701/100 |
| 2011/0056183 A1 * | 3/2011 | Sankrithi et al. | 60/204 |
| 2011/0079015 A1 * | 4/2011 | Geis et al. | 60/779 |
| 2011/0120079 A1 * | 5/2011 | Schwark et al. | 60/226.2 |
| 2011/0202251 A1 * | 8/2011 | Luppold | 701/100 |

OTHER PUBLICATIONS

The ARA large scale thrust measuring rig; Coulton, D.G.; Instrumentation in Aerospace Simulation Facilities, 1995. ICIASF '95 Record., International Congress on; Digital Object Identifier: 10.1109/ICIASF.1995.519123; Publication Year: 1995, pp. 17/1-17/1712.*

Conception of a UHB engine simulator for the essential characteristics of a true-scale engine; Bolms, H.T.; Braunling, W.; Instrumentation in Aerospace Simulation Facilities, 1991. ICIASF '91 Record., International Congress on; Digital Object Identifier: 10.1109/ICIASF.1991.186239; Publication Year: 1991, pp. 190-195.*

Damage mitigating control of a reusable rocket engine for structural durability; Halmes, M.; Patankar, R.; Ray, A.; Tangirala, S.; American Control Conference, 1998. Proceedings of the 1998; vol. 6; Digital Object Identifier: 10.1109/ACC.1998.703188 Publication Year: 1998, pp. 3317-3321 vol. 6.*

A dynamic model for the distributed simulation of a turbojet engine; Tournes, C.; Wells, B.E.; System Theory, 1998. Proceedings of the Thirtieth Southeastern Symposium on; Digital Object Identifier: 10.1109/SSST.1998.660031; Publication Year: 1998, pp. 125-129.*

Automatic thrust augmentation; Balaji, S.; Dinesh, M.; Raj, N.D.; Computer Engineering and Technology (ICCET), 2010 2nd International Conference on; vol. 5; Digital Object Identifier: 10.1109/ICCET.2010.5486136; Publication Year: 2010, pp. V5-465-V5-467.*

Design of magnetic nozzle for an advanced RF thruster; Lee, T.S.; Choe, W.; Plasma Science, 2003. ICOPS 2003. IEEE Conference Record—Abstracts. The 30th International Conference on; DOI: 10.1109/PLASMA.2003.1230007 Publication Year: 2003.*

Meeting IFPCS control system design challenges with H∞; Hyde, R.A.; Integrated Systems in Aerospace (Digest No: 1997/015), IEE Colloquium on; DOI: 10.1049/ic:19970109; Publication Year: 1997, pp. 4/1-4/3.*

International Search Report for PCT Application No. PCT/US2006/040070, Jan. 29. 2008.

* cited by examiner

REDUCED TAKE-OFF FIELD LENGTH
USING VARIABLE NOZZLE

BACKGROUND OF THE INVENTION

This invention relates to thrust vectoring during take-off and/or landing of an aircraft using, for example, a turbofan engine.

Take-off field length is an important parameter for large commercial aircraft. Enabling a commercial aircraft to utilize a shorter field length enables the aircraft to operate at a greater number of airport facilities. The take-off field length requirement is affected by factors such as aircraft gross take-off weight, aircraft aerodynamics, engine performance and operating environment. These same parameters also affect the ability of the aircraft to land on shorter fields.

Conventional engine installations on commercial aircrafts typically utilize a fixed nozzle that generates a fixed effective gross thrust angled relative to the aircraft horizontal axis. The fixed thrust angle is designed to provide the best overall performance throughout the aircraft flight envelope. However, this thrust angle may not be optimum specifically for take-off conditions.

What is needed is a commercial aircraft engine capable of changing the thrust angle during take-off and landing conditions.

SUMMARY OF THE INVENTION

A turbofan engine control system includes a core nacelle housing a compressor and a turbine. The fan is arranged upstream from the core nacelle and is surrounded by a fan nacelle. A bypass flow path is arranged downstream from the turbofan between the core and fan nacelles. The bypass flow path includes a nozzle exit area.

The controller detects either a take-off condition or a landing condition. The controller determines the take-off and landing conditions using various sensors that are typically indicative of those conditions. In one example, the controller changes the effective nozzle exit area to achieve a thrust vector in response to the take-off and landing conditions. The nozzle exit area is effectively changed, for example, by manipulating hinged flaps to achieve the thrust vector.

These and other features of the present invention can be best understood from the following specification and drawings, the following of which is a brief description.

DETAILED DESCRIPTION

Figure 1:
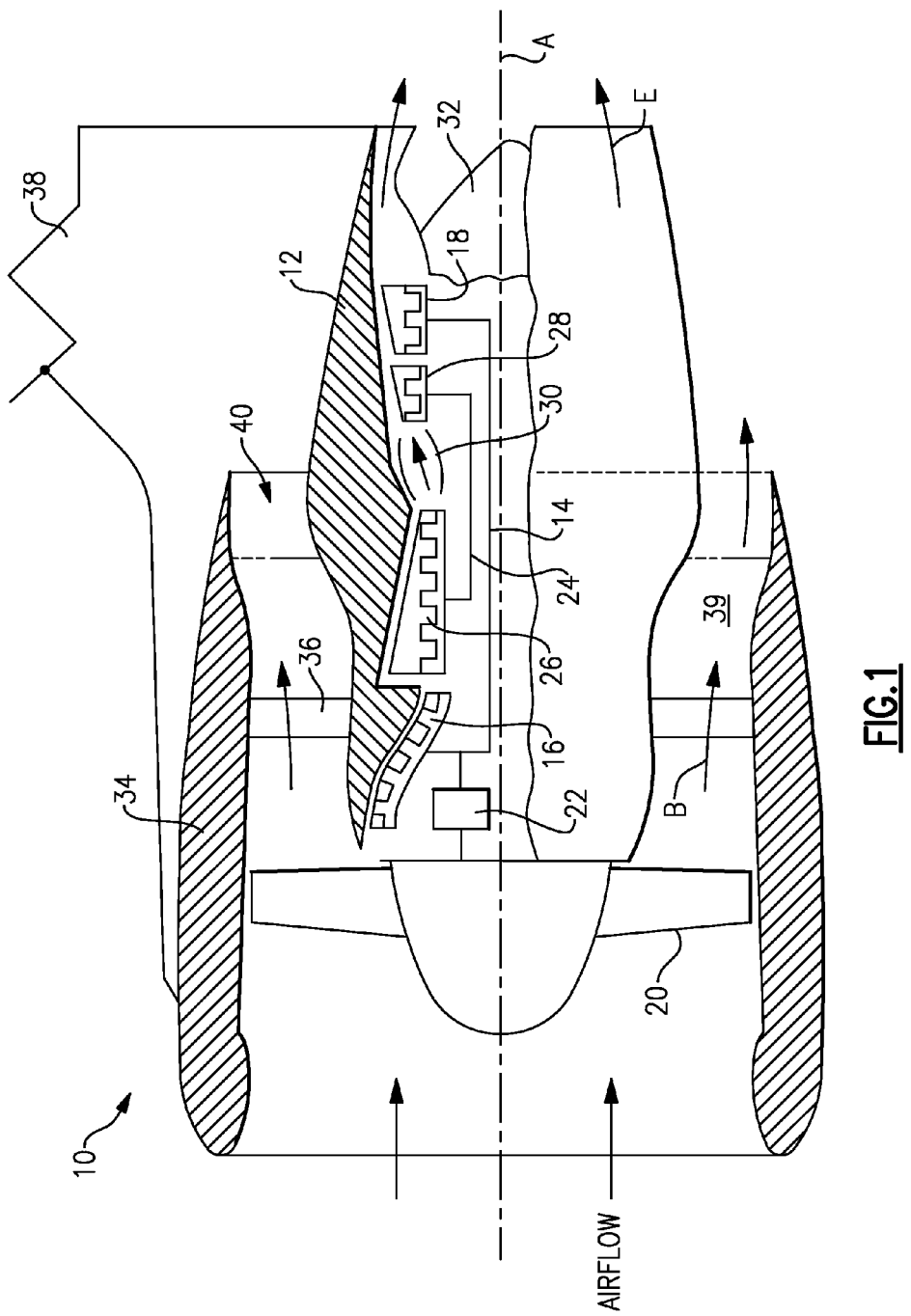
FIG. 1 is a cross-sectional view of an example geared turbofan engine.

A geared turbofan engine 10 is shown in FIG. 1. A pylon 38 secures the engine 10 to the aircraft. The engine 10 includes a core nacelle 12 that houses a low spool 14 and high spool 24 rotatable about an axis A. The low spool 14 supports a low pressure compressor 16 and low pressure turbine 18. In the example, the low spool 14 drives a turbofan 20 through a gear train 22. The high spool 24 supports a high pressure compressor 26 and high pressure turbine 28. A combustor 30 is arranged between the high pressure compressor 26 and high pressure turbine 28. Compressed air from compressors 16, 26 mixes with fuel from the combustor 30 and is expanded in turbines 18, 28.

In the examples shown, the engine 10 is a high bypass turbofan arrangement. In one example, the bypass ratio is greater than 10:1, and the turbofan diameter is substantially larger than the diameter of the low pressure compressor 16. The low pressure turbine 18 has a pressure ratio that is greater than 5:1, in one example. The gear train 22 is an epicycle gear train, for example, a star gear train, providing a gear reduction ratio of greater than 2.5:1. It should be understood, however, that the above parameters are only exemplary of a contemplated geared turbofan engine. That is, the invention is applicable to other engines including direct drive turbofans.

Airflow enters a fan nacelle 34, which surrounds the core nacelle 12 and turbofan 20. The turbofan 20 directs air into the core nacelle 12, which is used to drive the turbines 18, 28, as is known in the art. Turbine exhaust E exits the core nacelle 12 once it has been expanded in the turbines 18, 28, in a passage provided between the core nacelle and a tail cone 32.

The core nacelle 12 is supported within the fan nacelle 34 by structure 36, which are commonly referred to as upper and lower bifurcations. A generally annular bypass flow path 39 is arranged between the core and fan nacelles 12, 34. The example illustrated in FIG. 1 depicts a high bypass flow arrangement in which approximately eighty percent of the airflow entering the fan nacelle 34 bypasses the core nacelle 12. The bypass flow B within the bypass flow path 39 exits the fan nacelle 34 through a nozzle exit area 40.

For the engine 10 shown in FIG. 1, a significant amount of thrust may be provided by the bypass flow B due to the high bypass ratio. Thrust is a function of density, velocity and area. One or more of these parameters can be manipulated to vary the amount and direction of thrust provided by the bypass flow B. In one example, the engine 10 includes a structure associated with the nozzle exit area 40 to change the physical area and geometry to manipulate the thrust provided by the bypass flow B. However, it should be understood that the nozzle exit area may be effectively altered by other than structural changes, for example, by altering the boundary layer, which changes the flow velocity. Furthermore, it should be understood that any device used to effectively change the nozzle exit area is not limited to physical locations near the exit of the fan nacelle 34, but rather, includes altering the bypass flow B at any suitable location.

The engine 10 has a flow control device 41 (FIG. 3) that is used to effectively change the nozzle exit area. In one example, the flow control device 41 provides the fan nozzle exit area 40 for discharging axially the bypass flow B pressurized by the upstream turbofan 20 of the engine 10. A significant amount of thrust is provided by the bypass flow B due to the high bypass ratio. The turbofan 20 of the engine 10 is typically designed for a particular flight condition, typically cruise at 0.8M and 35,000 feet. The turbofan 20 is designed at a particular fixed stagger angle for an efficient cruise condition. The flow control device 41 is operated to vary the nozzle exit area 40 to adjust fan bypass air flow such that the angle of attack or incidence on the fan blade is maintained close to design incidence at other flight conditions, such as landing and takeoff. This enables desired engine operation over a range of flight condition with respect to performance and other operational parameters such as noise levels. In one example, the flow control device 41 defines a nominal converged position for the nozzle exit area 40 at cruise and climb conditions, and radially opens relative thereto to define a diverged position for other flight conditions. The flow control device 41 provides an approximately 20% change in the nozzle exit area 40.

Figure 2:
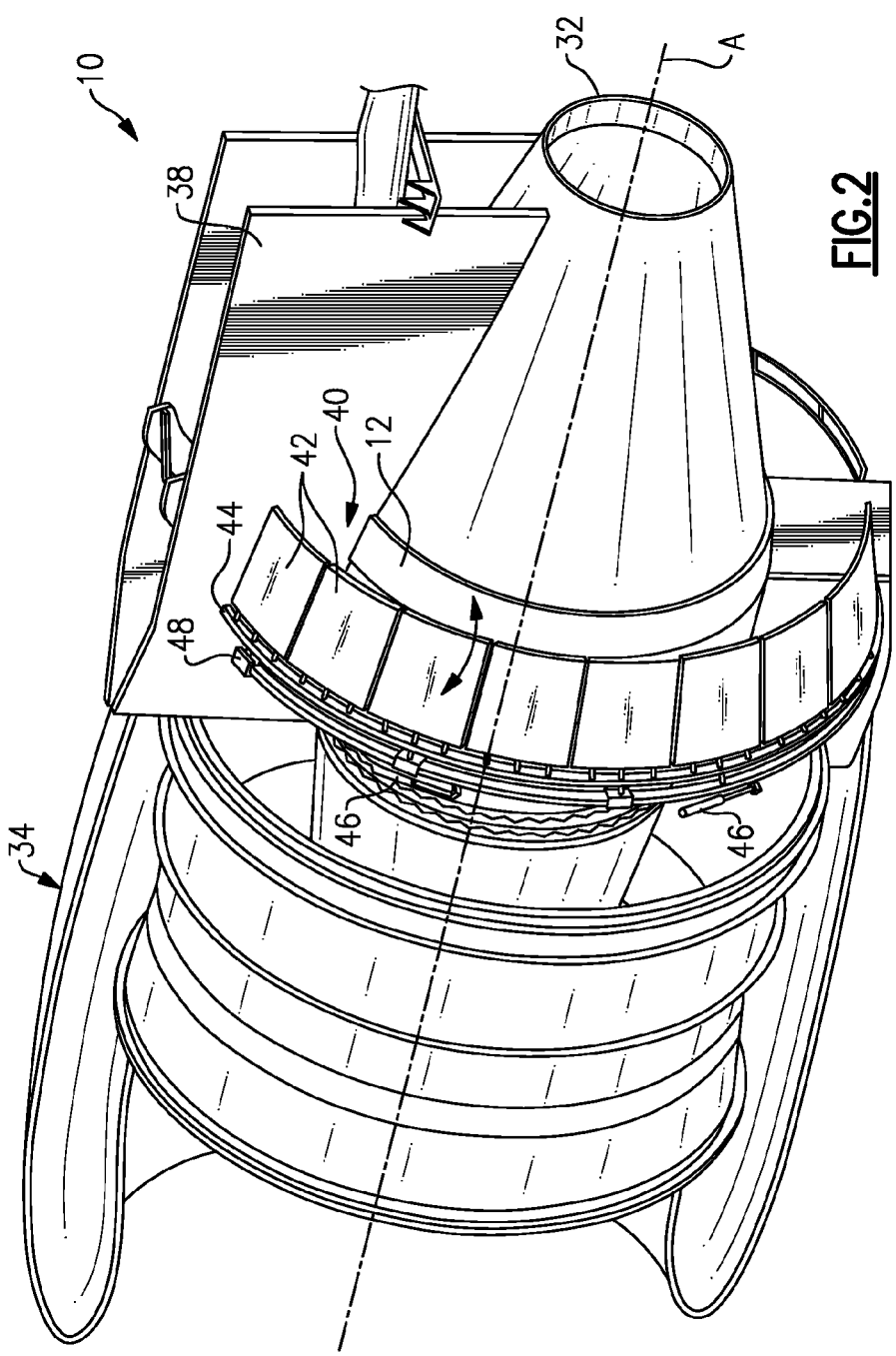
FIG. 2 is a partially broken perspective view of the engine shown in FIG. 1.

In one example, the flow control device 41 includes multiple hinged flaps 42 (FIG. 2) arranged circumferentially about the rear of the fan nacelle 34. The hinged flaps 42 can be actuated independently and/or in groups using segments 44. In one example, the segments 44 and each hinged flap 42 can be moved angularly using actuators 46. The segments 44 are guided by tracks 48 in one example. In the example shown, the hinged flaps 42 may be manipulated to change the amount and/or direction of thrust.

Figure 3:
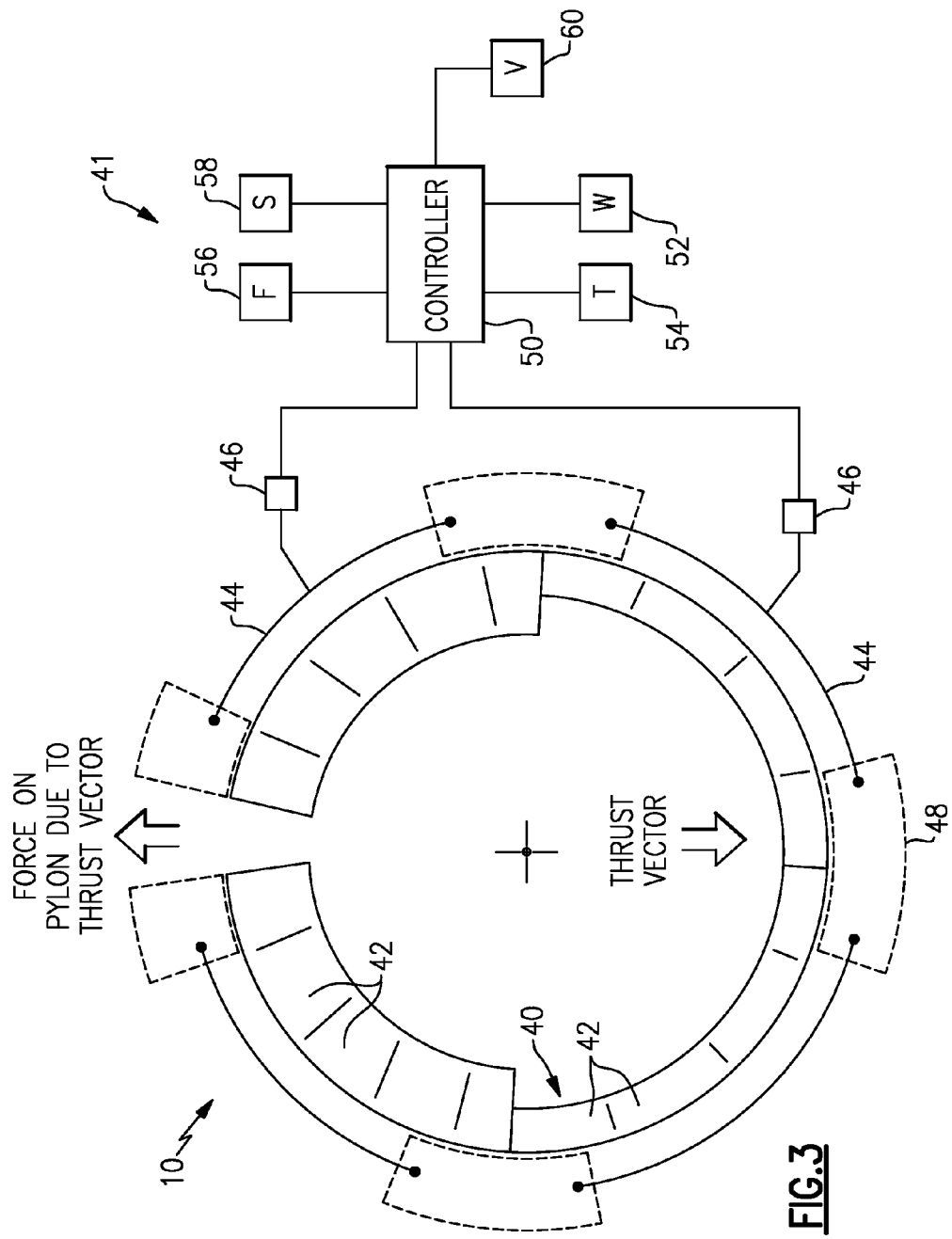
FIG. 3 is a schematic end view of the engine shown in FIG. 2 and its control system.

The thrust vector is changed by effectively altering the nozzle exit area 40 so that an aircraft can utilize a shorter field. In one example, a geometry of the nozzle exit area 40 is physically changed using the hinged flaps 42. FIG. 3 illustrates a downward thrust vector that assists the aircraft during take-off and landing. However, the thrust vector used in a particular application depends upon the location of the engine relative to the aircraft's center of gravity. In the example, the segments 44 are arranged in quadrants, and the upper quadrants are manipulated as a pair and the lower quadrants are manipulated as a pair to achieve the downward thrust vector. During take-off, the nozzle is varied to angle the thrust axies downward causing a component of the thrust to act as a net lifting force on the aircraft. The lifting force directly adds to the aerodynamic lift of the aircraft reducing the required aircraft take-off velocity and, thus, reduces the required take-off field length.

An associated control system is schematically shown in FIG. 3. The control system includes a controller 50 that communicates with the actuators 46, which manipulate the segments 44. Additional or alternative components to those discussed below can be used to communicate with the controller 50, which is programmed to manipulate the flow control device 41.

During one example take-off condition, the controller 50 commands the actuators 46 to achieve a downward thrust vector in response to, for example, a weight sensor 52 and a full throttle position indicator 54, which are indicative of a take-off condition. The weight sensor 52 is used to determine when the aircraft is on the ground. In one example, the controller 50 commands the actuators 46 to achieve a normal thrust vector once a predetermined aircraft velocity has been achieved subsequent to take-off. The normal thrust vector may provide a small downward thrust that is typical in fixed nozzle turbofan engines. Accordingly, the thrust vector achieved by the flow control device 41 is in addition to any normal thrust vector. The aircraft velocity is detected with an air speed sensor 60 and communicated to the controller 50.

In one example, the controller 50 also commands the actuators 46 to achieve a downward thrust vector in response to, for example, a full flap condition 56 indicative of the landing condition. In one example, the controller 50 commands the actuators 46 to achieve a normal thrust vector in response to actuation of a switch 58 by the pilot when the aircraft is taxing subsequent to landing.

In another example, an upward thrust vector can be used to reduce the overall trim drag related to operation of the aircraft aero-control surfaces. Additionally, the overall size and weight of the horizontal tails could be reduced.

Figure 4:
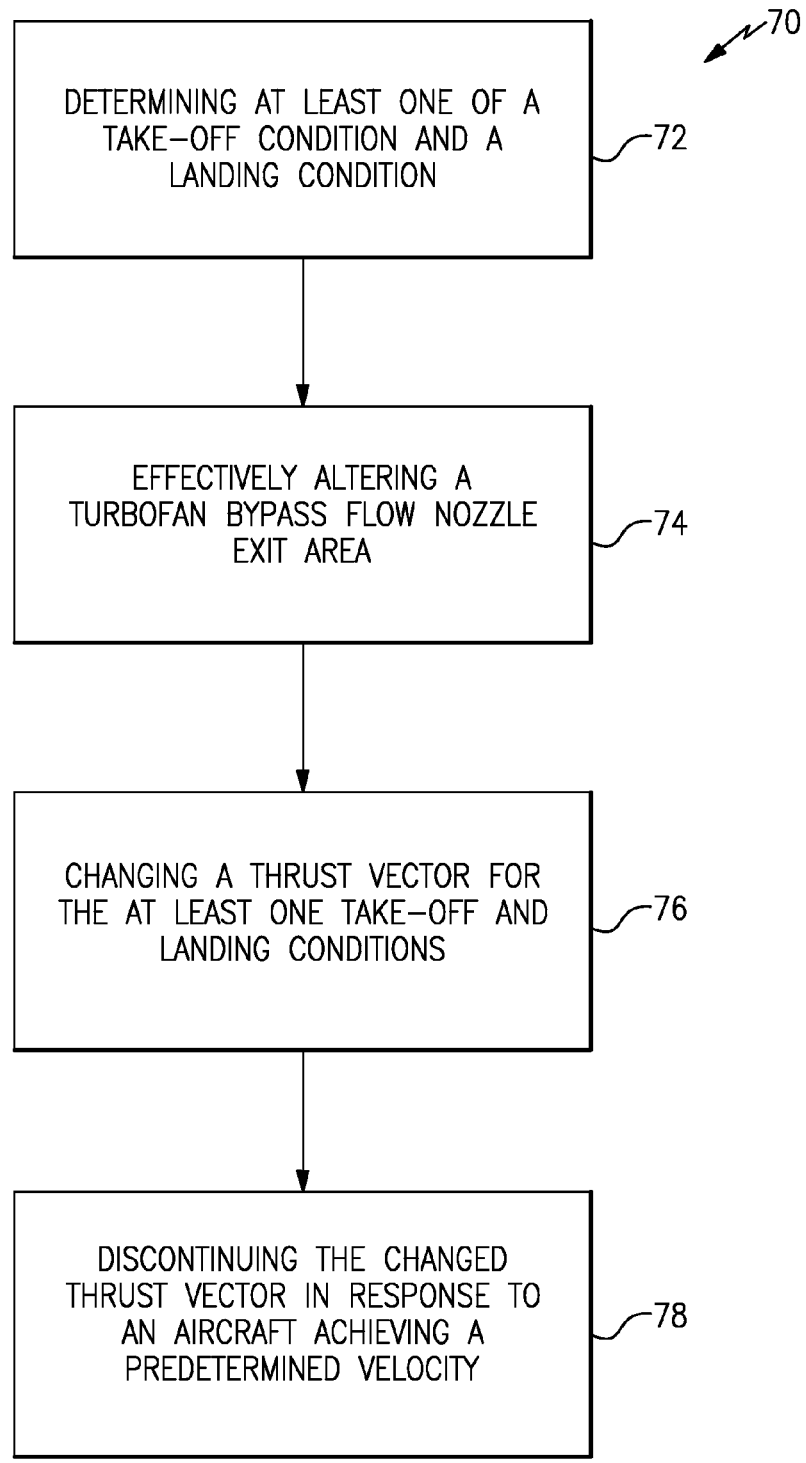
FIG. 4 is a flow chart depicting a method of controlling a turbofan engine.

FIG. 4 illustrates a method 70 of controlling a turbofan engine. The method 70 includes determining at least one of a take-off condition and a landing condition, indicated at 72. A turbofan bypass flow nozzle exit area is effectively altered, as indicated at 74. A thrust vector is changed for the at least one take-off and the landing conditions, as indicated at 76. The change thrust vector is discontinued in response to an aircraft achieving a predetermined velocity, as indicated at 78.

Although several example embodiments of this invention have been disclosed, a worker of ordinary skill in this art would recognize that certain modifications would come within the scope of this invention. For that reason, the following claims should be studied to determine the true scope and content of this invention.

The invention claimed is:

1. A turbofan engine control system comprising:
   a core nacelle housing a compressor and a turbine;
   a turbofan arranged upstream from the core nacelle and surrounded by a fan nacelle;
   a bypass flow path downstream from the turbofan and arranged between the core and fan nacelles, the bypass flow path including a nozzle exit area;
   a controller programmed to detect at least one of a take-off condition and a landing condition, the controller programmed to effectively alter the nozzle exit area to change a thrust vector in response to the at least one of the take-off and the landing conditions; and
   wherein the core nacelle includes a low spool supporting the compressor and turbine, the low spool for rotationally driving the turbofan through an epicyclic gear train.

2. The turbofan engine control system according to claim 1, wherein the landing condition includes initiation of a landing.

3. The turbofan engine control system according to claim 1, wherein the core nacelle includes a high spool supporting a high pressure compressor and a high pressure turbine.

4. The turbofan engine control system according to claim 1, comprising a flow control device including an actuator for changing the nozzle exit area physically in response to the at least one of the take-off and the landing conditions.

5. The turbofan engine control system according to claim 4, wherein the flow control device includes flaps movable in response to the actuator to change the thrust vector.

6. The turbofan engine control system according to claim 5, wherein a geometry of the nozzle exit area is changed in response to the at least one of the take-off and the landing conditions.

7. The turbofan engine control system according to claim 1, wherein the take-off condition includes a maximum take-off throttle.

8. The turbofan engine control system according to claim 3, wherein the gear train includes a gear reduction ratio greater than 2.5:1.

9. The turbofan engine control system according to claim 7, wherein the controller is programmed to discontinue the thrust vector in response to an aircraft achieving a predetermined velocity.

10. The turbofan engine control system according to claim 3, wherein the high and low spool and the turbofan provide a bypass ratio that is greater than 10:1.

11. The turbofan engine control system according to claim 3, wherein the turbine of the low spool includes a pressure ratio that is greater than 5:1.

12. The turbofan engine control system according to claim 2, wherein the controller is programmed to discontinue the thrust vector in response to a command manually by a pilot.

13. The turbofan engine control system according to claim 2, wherein the initiation of the landing includes engagement of full flaps down.

14. A method of controlling a turbofan engine having a fan that is rotationally driven by an epicyclic gear train comprising the steps of:
   a) determining at least one of a take-off condition and a landing condition;

b) effectively altering a turbofan bypass flow nozzle exit area in response to performing step a);

c) changing a thrust vector for the at least one of the take-off and the landing conditions; and d) discontinuing the changed thrust vector in response to an aircraft achieving a predetermined velocity.

15. The method according to claim 14, wherein step a) includes sensing a maximum take-off throttle.

16. The method according to claim 14, wherein step a) includes initiating a landing.

17. The method according to claim 16, wherein step a) includes engaging full flaps.

18. The method according to claim 16, comprising step d) manually discontinuing the thrust vector.

19. The method according to claim 14, wherein step b) includes changing the nozzle exit area physically in response to the at least one of the take-off and the landing conditions.

20. The method according to claim 14, wherein steps a) through d) are performed by a controller programmed to detect at least one of a take-off condition and a landing condition and to effectively alter the nozzle exit area.

\* \* \* \* \*

UNITED STATES PATENT AND TRADEMARK OFFICE
CERTIFICATE OF CORRECTION

PATENT NO. : 8,935,073 B2
APPLICATION NO. : 12/374131
DATED : January 13, 2015
INVENTOR(S) : Wayne Hurwitz Page 1 of 1

It is certified that error appears in the above-identified patent and that said Letters Patent is hereby corrected as shown below:

IN THE CLAIMS:

In claim 6, column 4, line 37; delete "5" and replace with --4--

Signed and Sealed this
Fourteenth Day of July, 2015

Michelle K. Lee
*Director of the United States Patent and Trademark Office*